(No Model.)
D. A. RITCHIE.
TUBE CUTTER.
No. 328,973. Patented Oct. 27, 1885.
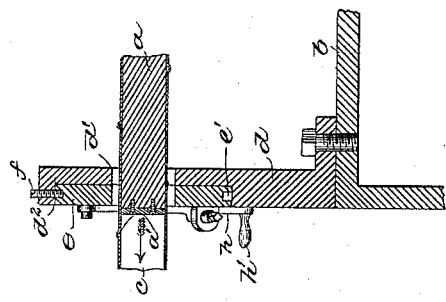
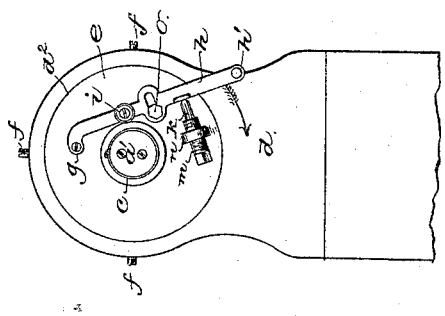
Witnesses
John F. C. Primkert
John F. Nelson.
Inventor
David A. Ritchie.
by Crosby Gregory
attys

UNITED STATES PATENT OFFICE.

DAVID A. RITCHIE, OF BOSTON, MASSACHUSETTS.

TUBE-CUTTER.

SPECIFICATION forming part of Letters Patent No. 328,973, dated October 27, 1885.

Application filed February 2, 1885. Serial No. 154,676. (No model.)

*To all whom it may concern:*

Be it known that I, DAVID A. RITCHIE, of Boston, (Chelsea,) county of Suffolk, and State of Massachusetts, have invented an Improvement in Cutting Apparatus for Sheet-Metal Tubing, of which the following description, in connection with the accompanying drawings, is a specification, like letters on the drawings representing like parts.

My invention relates to cutting apparatus intended to be used in connection with a machine for making sheet-metal tubing from continuous strips of sheet metal, the edges of the sheet metal being united by a machine, which forms the tubing continuously on a mandrel. This tubing has to be cut into uniform lengths suitable for shipment, and, as practiced prior to my invention, the tubing as it is delivered from the machine has been cut into lengths by a saw or other cutting apparatus independent of the machine by which the tubing is made. By this method considerable time is consumed in cutting off the tubing, and it is difficult to make the pieces of uniform length, and the edges of the tubing where cut are rough and uneven, and not square with the tubing.

In my invention the machine by which the tubing is made has connected with, and forming a part of it, a cutting device co-operating with the mandrel over which the tubing is formed by the machine, this cutting device operating to cut the tubing quickly and smoothly.

Figure 1 is a front elevation of a cutting apparatus embodying this invention forming part of a machine for manufacturing sheet-metal tubing, and Fig. 2 is a vertical section thereof.

The machine for making the metal tubing may be of any suitable or usual construction, a portion only of the mandrel $a$ and bed or frame-work $b$ of the machine being shown in Fig. 2, this being sufficient to illustrate the present invention, which is independent of the particular mechanism employed for forming the tubing. As shown, in this instance the invention is used in connection with a machine for making spiral tubing, or tubing composed of a strip of metal wound spirally about the mandrel $a$, and having its edges united by a spiral-lapped seam or joint, a portion of the tubing being shown at $c$.

In the operation of the machine the tubing $c$ is delivered from the end of the mandrel $a$ with a continuous movement in the direction of the arrow thereon, Fig. 2, and when a sufficient length has been made the machine is stopped and the portion of the tube beyond the mandrel is cut off.

In order to cut the tubing smoothly and quickly, the machine is provided with a cutting device supported on an upright or bracket, $d$, fastened upon the table $b$ of the machine, and having an opening, $d'$, concentric with the mandrel $a$, through which opening the tubing $c$ passes as it is made by the machine.

The upright $d$ has a circular socket, $d^2$, which receives a plate, $e$, shown as having a circumferential groove, $e'$, engaged by set-screws $f$ in the bracket, which hold the said plate in the socket, and are adjusted to produce a slight friction, so as to prevent the plate from turning freely in the socket, although it may turn when sufficient power is applied.

The plate $e$ has pivotally connected with it at $g$ an arm or lever, $h$, provided with a cutter, $i$, consisting of a sharp-edged disk pivoted on the said lever and having one face in the plane of the end of the mandrel $a$, so that when the said disk is pressed toward the mandrel its edge will pass through the sheet metal supported on the mandrel with a shearing cut.

The arm or lever $h$ is provided with a handle, $h'$, and is acted upon by a spring-plunger, $k$, longitudinally movable in a hollow bolt, $m$, containing a spring, which acts on the said plunger, forcing it outward, the said bolt screwing into a lug, $n$, on the plate $e$, thus enabling the pressure of the plunger against the lever $h$ to be adjusted by turning the said bolt in one or the other direction.

The movement of the lever $h$ on its pivot $g$ in either direction is limited by a suitable stop, shown in this instance as a bolt, $o$, passing through a slot in the said lever, the bolt being connected with or screwed into the plate $e$.

When in the operation of the machine the tubing made projects the distance desired for a single length or piece—for instance, ten or